(12) United States Patent
Yuan

(10) Patent No.: US 8,776,711 B2
(45) Date of Patent: Jul. 15, 2014

(54) ACTIVE HEAVE COMPENSATION WITH ACTIVE DAMPING CONTROL

(75) Inventor: QingHui Yuan, Maple Grove, MN (US)

(73) Assignee: Eaton Corporation, Cleveland, OH (US)

( * ) Notice: Subject to any disclaimer, the term of this patent is extended or adjusted under 35 U.S.C. 154(b) by 233 days.

(21) Appl. No.: 12/971,859

(22) Filed: Dec. 17, 2010

(65) Prior Publication Data

US 2011/0146556 A1 Jun. 23, 2011

Related U.S. Application Data

(60) Provisional application No. 61/288,389, filed on Dec. 21, 2009.

(51) Int. Cl.
*B63B 27/00* (2006.01)

(52) U.S. Cl.
USPC .......................................... 114/268

(58) Field of Classification Search
USPC ............................ 114/268; 212/308
See application file for complete search history.

(56) References Cited

U.S. PATENT DOCUMENTS

| | | | | |
|---|---|---|---|---|
| 3,871,217 A | * | 3/1975 | Miley | 73/862.41 |
| 5,894,895 A | * | 4/1999 | Welsh | 175/5 |
| 6,216,789 B1 | * | 4/2001 | Lorsignol et al. | 166/355 |
| 6,826,452 B1 | * | 11/2004 | Holland et al. | 700/245 |
| 7,731,157 B2 | * | 6/2010 | Davidson | 254/277 |
| 8,265,811 B2 | * | 9/2012 | Kyllingstad | 701/21 |
| 2003/0107029 A1 | * | 6/2003 | Hanson et al. | 254/362 |
| 2010/0230370 A1 | | 9/2010 | Schneider et al. | |

FOREIGN PATENT DOCUMENTS

| | | |
|---|---|---|
| GB | 2447759 A | 9/2008 |
| WO | 0177000 A1 | 10/2001 |
| WO | 2008068445 A1 | 6/2008 |

* cited by examiner

*Primary Examiner* — Daniel V. Venne
*Assistant Examiner* — Anthony Wiest
(74) *Attorney, Agent, or Firm* — Quinn Law Group, PLLC

(57) ABSTRACT

A damping control system includes a first sensor configured to detect movement of a vessel and generate a first signal representing the vessel movement and a second sensor configured to detect movement of a cable and generate a second signal representing the cable movement. An actuator is configured to dampen a force applied to a payload during a force event. The force event is at least partially caused by the movement of the vessel and the cable. A controller is configured to identify the force event based at least in part on the first and second signals and control the actuator during the force event to substantially dampen the force applied to the payload.

10 Claims, 4 Drawing Sheets

ACTIVE HEAVE COMPENSATION WITH ACTIVE DAMPING CONTROL

CROSS-REFERENCE TO RELATED APPLICATIONS

This application claims the benefit of U.S. Provisional Patent Application No. 61/288,389, filed Dec. 21, 2009, which is hereby incorporated by reference in its entirety.

TECHNICAL FIELD

The disclosure relates to active heave compensation using an active damping control system.

BACKGROUND

Offshore fossil fuel exploration provides opportunities for new sources of fossil fuels to be discovered beneath a seabed of a body of water. An offshore platform or vessel floating on the surface of the water may support a crane that is connected to equipment on the seabed via a cable. Longer cables may allow for the discovery and production of fossil fuels, such as oil and gas, in increasingly deep waters.

SUMMARY

A damping control system includes a first sensor configured to detect movement of a vessel and generate a first signal representing the vessel movement and a second sensor configured to detect movement of a cable and generate a second signal representing the cable movement. An actuator is configured to dampen a force applied to a payload during a force event. The force event is at least partially caused by the movement of the vessel and the cable. A controller is configured to identify the force event based at least in part on the first and second signals and control the actuator during the force event to substantially dampen the force applied to the payload.

A method includes detecting movement of a vessel relative to a payload, and detecting movement of a cable relative to the payload. The method further includes identifying a force event based on the movement of the vessel and the cable. The force event causes a force to be applied to the payload via the cable. Moreover, the method includes controlling an actuator during the force event based at least in part on the detected movement of the vessel and the cable to dampen the force applied to the payload.

The features and advantages of the present disclosure are readily apparent from the following detailed description of the best modes for carrying out the invention when taken in connection with the accompanying drawings.

DETAILED DESCRIPTION

A vessel may use a damping control system to compensate for forces that could damage a payload. Compensating for such forces may result in increased uptime, and thus, increased productivity. The damping control system may take many different forms and include multiple and/or alternate components and facilities. While an example vessel having a damping control system is shown in the Figures, the components illustrated in the Figures are not intended to be limiting. Indeed, additional or alternative components and/or implementations may be used.

Figure 1:
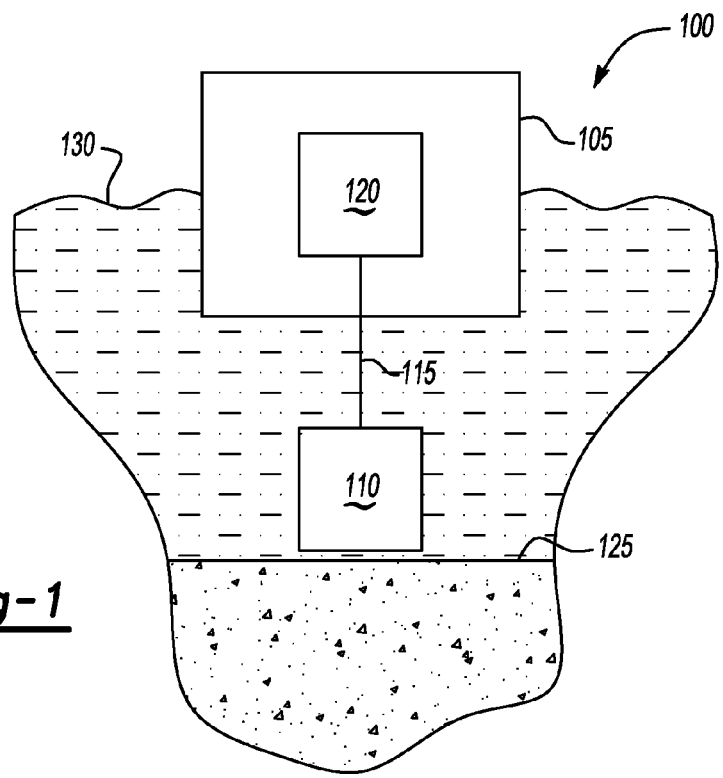
FIG. 1 is a schematic diagram of an example vessel connected to a payload via a cable and having a damping control system.

FIG. 1 illustrates an example vessel 100 having a body 105, a payload 110, a cable 115, and a control system 120. The vessel 100 may include any watercraft or other structure configured to float on the surface of a body of water 130. For instance, the vessel 100 may be a drillship, a boat, an offshore platform, etc.

The body 105 of the vessel 100 may include any number of structures configured to allow the vessel 100 to float on the surface of the water 130 and support equipment, such as a crane (not shown), that may be used during fossil fuel exploration and/or production. In one example approach, the body 105 may include a hull and a deck or a platform. Because the body 105 floats on the surface of the water 130, the body 105 is susceptible to wave elevation, wind, and other weather conditions. As such, the body 105 may pitch, roll, and heave with the motion of the waves.

Figure 3:
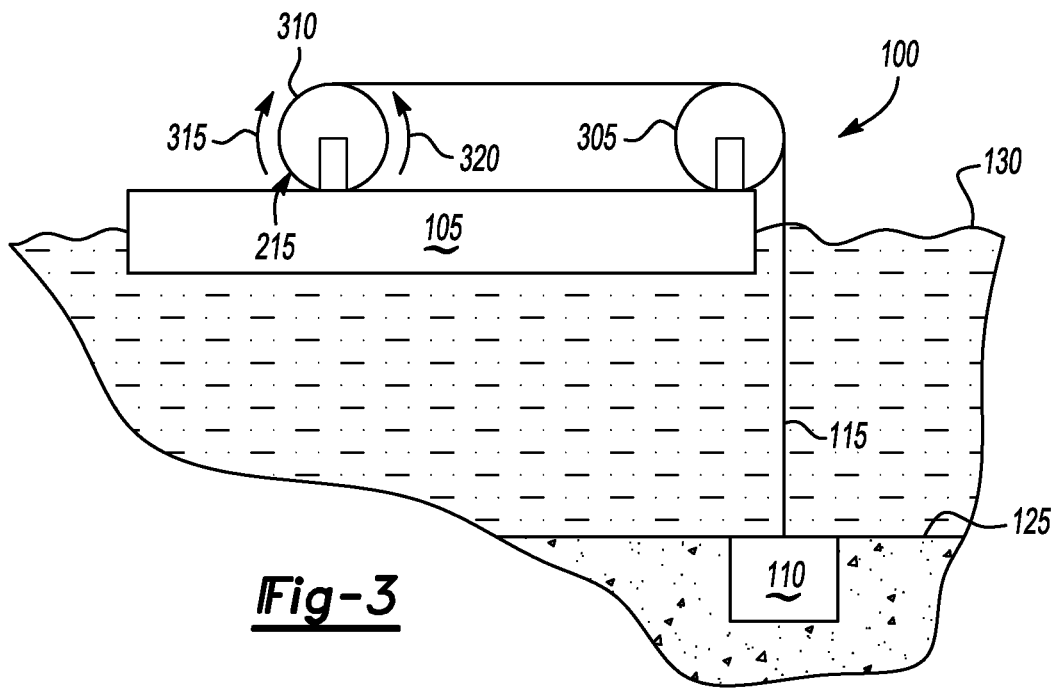
FIG. 3 is a schematic diagram of an example winch-based damping control system.
Figure 4:
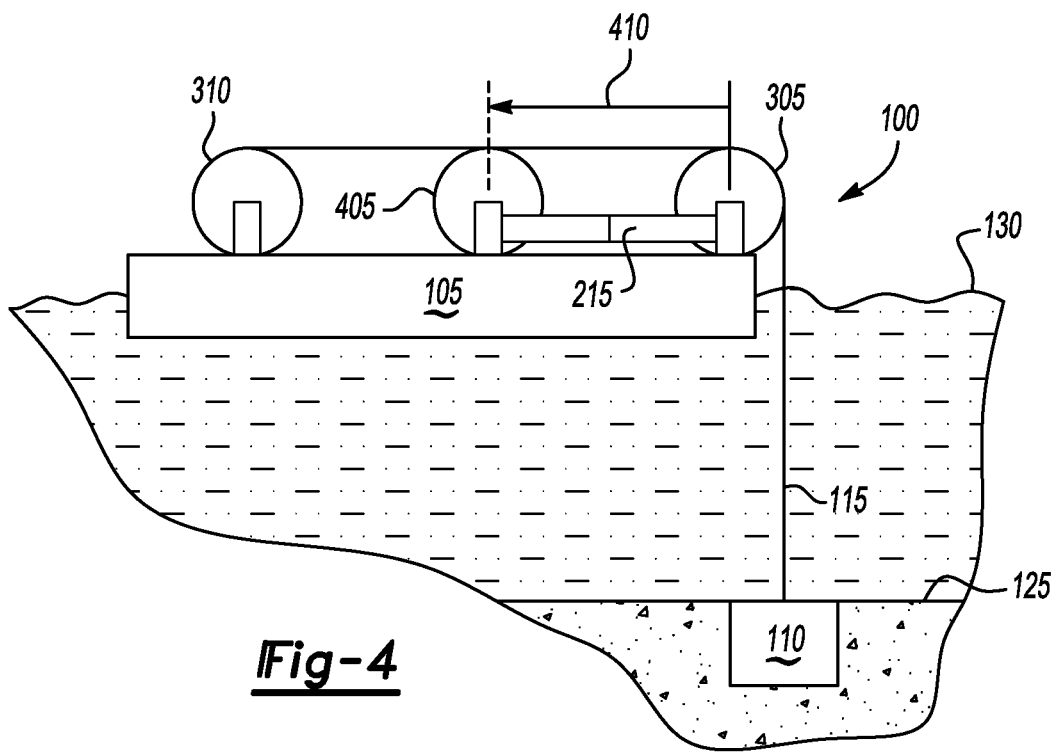
FIG. 4 is a schematic diagram of an example sheave-based damping control system.

The payload 110 may include any number of devices configured to be suspended in the water 130 for some period of time and/or interact with a seabed 125 during, e.g., fossil fuel exploration. The payload 110 may include a drill configured to penetrate the seabed 125 alone or in combination with, e.g., a riser, a drill pipe, a casing, etc. One or more components of the payload 110 may interact with the seabed 125 via a wellhead. As illustrated in FIG. 1, the payload 110 is suspended in the water 130. However, as discussed below, FIGS. 3 and 4 illustrate example approaches where the payload 110 is disposed in the seabed 125. Alternatively, the payload 110 may be disposed on the seabed 125.

The cable 115 may include any device configured to connect one or more components of the payload 110 to the vessel 100. The cable 115 may be used to lower the payload 110 from the vessel 100 to the seabed 125, and raise the payload 110 from the seabed 125 to the vessel 100. The cable 115 may have any length that is sufficient to allow one or more components of the payload 110 to reach and interact with the seabed 125. The movement of the body 105 may cause the cable 115 to move (e.g., oscillate or vibrate). As discussed below, the movement of the cable 115 may be attenuated by changing an effective length of the cable 115. The term "effective length" may describe the amount of slack available or the tension on the cable 115. As such, the effective length may be related to the length of the cable 115 underneath the surface of the water 130, the length of the cable 115 between the vessel 100 and the payload 110, etc. The effective length may be adjusted to control the tension of the cable 115, and thus, attenuate the movement of the cable 115.

The control system 120 may include any number of devices configured to identify and compensate for a force event to, e.g., prevent damage to the payload 110. The force event may include any movement of the vessel 100 and/or cable 115 that may damage the payload 110. The term "movement of the vessel" may refer to the movement of any component of the vessel 100, including the body 105 or components supported on the body 105, caused by wave elevation, wind, or other weather conditions. While the cable 115, as illustrated, is part of the vessel 100, the term "movement of the cable" may refer to any movement of the cable 115 that could damage the payload 110. Upon identification of the force event, the control system 120 may be configured to control the tension of the cable 115 to substantially attenuate the movement of the cable 115, and thus, reduce the risk of damage to the payload 110 during force events.

To compensate for force events, the control system 120 may be configured to model any combination of, e.g., the wave elevation, the movement of the vessel 100, including components disposed on the vessel 100, the movement of the cable 115, and the dynamics of the components of the control system 120. For example, the control system 120 may, given a special coordinate of the body of water 130, determine a time-series wave elevation based on, e.g., the harmonic wave amplitude, the harmonic wave frequencies, the harmonic wave phases, the harmonic wave length, the harmonic wave direction, the harmonic wave component index, and the number of harmonic components. Such a wave model may provide a sufficiently accurate representation of the environmental conditions of the vessel 100 in the water 130.

The model of the vessel 100, including components like a crane disposed on the vessel 100, may be based, at least in part, on hydrodynamic forces from the wave elevation and the hydrodynamic force effects of the movement of the vessel 100 itself. To determine hydrodynamic forces, the response due to irregular water 130 movement can be obtained by combining a linear response of regular and sinusoidal waves with nonlinear loads. The hydrodynamic force can be classified as a radiation load and an excitation load. A force response amplitude operator may be used to find the force response. The vessel 100 motion can be computed using a second-order dynamics that consider parameters of the vessel 100 that may be estimated from the geometry of, e.g., the body 105 of the vessel 100 and environmental conditions.

The cable 115 may be modeled as a mass-less compliance-free cable 115 plus an equivalent spring. The dynamics of the cable 115 may be determined from a length of the cable 115 relative to a reference point, such as a crane tip or other component on the vessel 100, and an equivalent spring coefficient.

The dynamics of various components of the control system 120 may be modeled in a way that allows the control system 120 to attenuate the movement of the cable 115. The movement of the cable 115 may be caused by, e.g., the movement of the vessel 100 due to wave elevation. Therefore, the model of the components of the control system 120 may consider, for instance, a distance between the components of the control system 120 and the components of the vessel 100, such as the crane tip, given the movement (e.g., heave) of the vessel 100 caused by wave elevation. The model may further consider acceleration, damping, gravity, etc. With the model, the control system 120 may generate one or more control signals that may be used to control one or more components of the control system 120 that may act upon the cable 115 to attenuate the movement of the cable 115, as discussed in greater detail below.

As discussed in greater detail below, the control system 120 may, using the models described above, compensate for the movement of the vessel 100 and the movement of the cable 115 to protect the payload 110 from damage caused by such movement.

Figure 2:
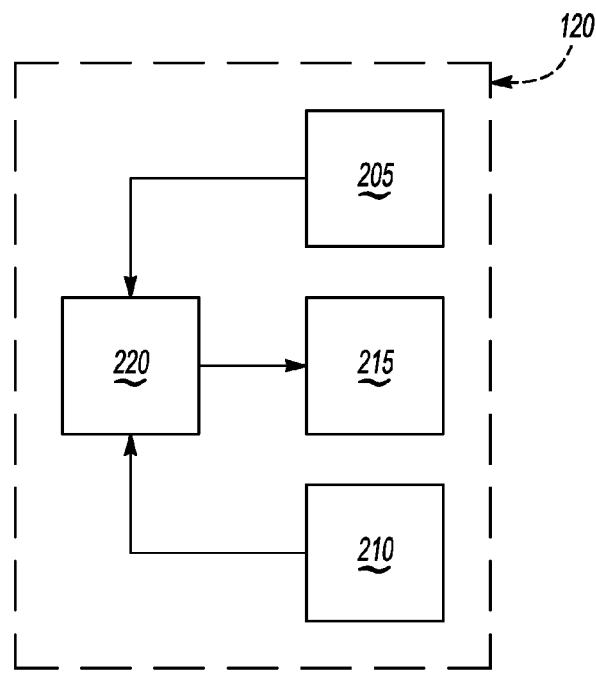
FIG. 2 is a schematic diagram of an example damping control system used in the vessel of FIG. 1.

FIG. 2 illustrates an example control system 120 that may be used by the vessel 100 to protect the payload 110 from damage during force events. The control system 120 may include a first sensor 205, a second sensor 210, an actuator 215, and a controller 220.

The first sensor 205 may include any device configured to measure movement of the vessel 100. For instance, the first sensor 205 may be configured to detect the movement of the vessel 100 that may be caused by one or more waves. As such, the first sensor 205 may include one or more gyroscopes. The first sensor 205 may further be configured to derive the movement of the vessel 100 based on movement of any component disposed on the vessel 100, such as a crane. The first sensor 205 may be configured to generate a first signal representing the movement of the vessel 100. The first signal may represent motion relative to any number of degrees of freedom. Therefore, the first signal may represent one or more of pitch, roll, and heave of the vessel 100 caused by the waves, wind, or other weather conditions.

The second sensor 210 may include any device configured to measure the movement of the cable 115. For instance, the second sensor 210 may be configured to measure vibrations or oscillations of the cable 115 in general or as a result of the movement of the body 105 of the vessel 100. In one possible approach, the second sensor 210 may include an accelerometer, a piezoelectric sensor, and/or a vibration sensor. The second sensor 210 may be configured to generate a second signal representing the movement of the cable 115.

The actuator 215 may include any device configured to facilitate motion when provided with, e.g., electrical or hydraulic energy. For instance, the actuator 215 may be configured to receive a control signal and move in accordance with the control signal. In one possible approach, the actuator 215 may include an electric motor or winch (see FIG. 3) configured to generate rotational motion. The control signal in this example implementation may control an angular displacement of the actuator 215. Alternatively, the actuator 215 may include a hydraulic cylinder (see FIG. 4) configured to provide translational motion and act on another device, such as one or more sheaves. The amount of translational motion may be commanded by the control signal so that the control signal may control the length of the actuator 215. When used with two sheaves as illustrated in FIG. 4, below, the length of the actuator 215 may control the distance between the sheaves.

The actuator 215 may be either directly or indirectly connected to the cable 115 so that the actuator 215 may act on the cable 115. That is, the angular displacement or length of the actuator 215 may be used to change the length of the cable 115. In one possible approach, the actuator 215 may increase the effective length of the cable 115 when rotated or translated in one direction and decrease the effective length of the cable 115 when rotated or translated in an opposite direction. Since the force transmitted to the payload 110 via the cable 115 may be attenuated by changing the length of the cable 115, the actuator 215 may be used to dampen the force applied to the payload 110 caused by the movement of the cable 115, as discussed below.

The controller 220 may include any device configured to identify the force event based, at least in part, on the signals generated by the first sensor 205, the second sensor 210, or both. The signals from the first sensor 205 and the second sensor 210 represent movement of the vessel 100 and the cable 115, and such movement may cause a force that can damage the payload 110. The controller 220 may be configured to identify the force event as any force sufficient to damage the payload 110 caused during the movement of the vessel 100 and/or cable 115. Since the actuator 215 may directly or indirectly act on the cable 115 to attenuate the vibrations or movement of the cable 115, the controller 220 may be further configured to control the actuator 215 during the force event in a way that, e.g., substantially dampens the force applied to the payload 110. In one possible approach, the controller 220 may be configured to generate the control signal that may be used to command the actuator 215 to a particular angular position or length, as described below with respect to FIGS. 3 and 4.

In general, computing systems and/or devices, such as the controller 220, etc., may employ any of a number of computer operating systems and may include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cable, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

FIG. 3 illustrates a vessel 100 having a winch-based control system that may be used to substantially dampen the force applied to the payload 110 during force events. As disclosed in FIG. 3, the vessel 100 includes the body 105, the cable 115, and payload 110 as described above. The vessel 100 may further include a first sheave 305 disposed on the body 105 and, as illustrated, the actuator 215 may be implemented via a winch 310.

The first sheave 305 may include any device, such as a pulley, configured to change a direction of an applied force. For instance, the first sheave 305 may be used to change the direction of a force exerted by or on the cable 115. In one possible approach, the first sheave 305 may include a wheel having a groove configured to support the cable 115. The cable 115 may extend in a generally vertical direction between the vessel 100 and the seabed 125 and the cable 115 may further extend in a direction that is generally (e.g., when there is no wave elevation) horizontal relative to the seabed 125 to connect to the actuator 215. The first sheave 305, therefore, may be configured to facilitate the change in direction of the cable 115 between the actuator 215 and the payload 110. The first sheave 305 may have an axle that is fixed (e.g., stationary) relative to the body 105 of the vessel 100. Therefore, the first sheave 305 may rotate about the axis but may not be able to translate relative to the winch 310.

The winch 310 may include any device configured to rotate to change the effective length of the cable 115. For instance, the winch 310 may be configured to rotate in a first direction 315 to increase the length of the cable 115 and rotate in a second direction 320 to decrease the effective length of the cable 115. By adjusting the effective length of the cable 115, the winch 310 may be used to change the tension of the cable 115. That is, the winch 310 may be configured to receive the command signal from the controller 220, and the position (e.g., angular displacement) of the winch 310 may be based on the control signal.

In operation, the controller 220 may control the winch 310 to change the effective length of the cable 115 based on, e.g., the first signal from the first sensor 205 and the second signal from the second sensor 210. When the vessel 100 heaves away from the seabed 125, the controller 220 may cause the winch 310 to rotate in a first direction 315, causing the effective length of the cable 115 to increase. When the vessel 100 heaves toward the seabed 125, the controller 220 may cause the winch 310 to rotate in a second direction 320 that decreases the effective length of the cable 115. The controller 220 may control the rotation of the winch 310 by generating a control signal that designates a particular angular displacement of the winch 310.

FIG. 4 is a schematic diagram of an example vessel 100 having a sheave-based control system that may be used to substantially dampen the force applied to the payload 110 during force events. The vessel 100 of FIG. 4 includes the body 105, the cable 115, the payload 110, the winch 310, and the first sheave 305, which are generally the same as those previously described. The vessel 100 of FIG. 4 further includes a second sheave 405, and the actuator 215 of FIG. 4 is implemented as, e.g., a hydraulic cylinder 415 disposed between the first sheave 305 and the second sheave 405.

The second sheave 405 may include any device, such as a pulley, configured to move relative to the first sheave 305 to change the effective length of the cable 115. For instance, the second sheave 405 may include a wheel defining a groove configured to support the cable 115. The cable 115 may be disposed on both the first sheave 305 and the second sheave 405, and the distance 410 between the first sheave 305 and the second sheave 405 may determine the effective length of the cable 115.

In operation, the controller 220 may control the actuator 215 to increase or decrease the effective length of the cable 115 based on, e.g., the first signal from the first sensor 205 and the second signal from the second sensor 210. In one possible approach, the effective length of the cable 115 may be related to the distance 410 between the first sheave 305 and the second sheave 405. When the vessel 100 heaves away from the seabed 125, the controller 220 may cause the actuator 215 to reduce the distance 410 between the first sheave 305 and the second sheave 405, and thus, increase the effective length of the cable 115. When the vessel 100 heaves toward the seabed 125, the controller 220 may cause the actuator 215 to increase the distance 410 between the first sheave 305 and the second sheave 405. The increased distance 410 between the first sheave 305 and the second sheave 405 may decrease the effective length of the cable 115. The controller 220 may control the length of the actuator 215 via a control signal that considers information represented by the first signal and the second signal.

Figure 5:
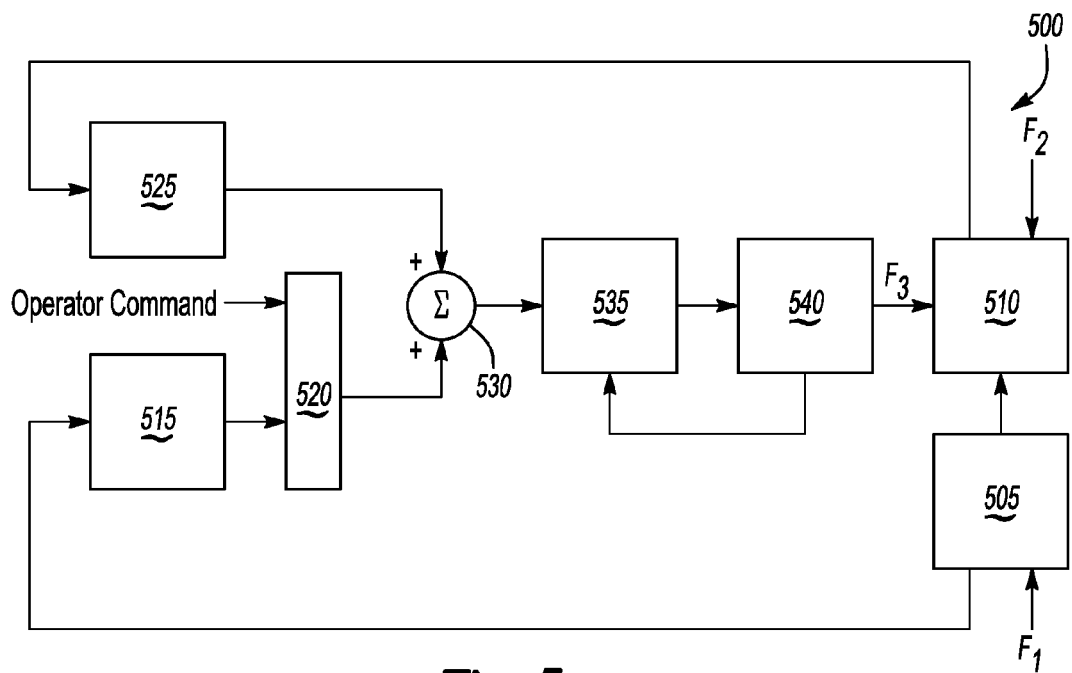
FIG. 5 illustrates an example signal flow diagram that may be used to compensate for movement of a vessel and a cable.

FIG. 5 illustrates an example signal flow diagram 500 that may be used by the control system 120 to compensate for the movement of the vessel 100 and the movement of the cable 115.

At block 505, the first sensor 205 may detect movement of the vessel 100 based on, e.g., a force $F_1$ caused by wave elevation. The first sensor 205 may generate the first signal representing the movement of the vessel 100. The first sensor 205 may consider physical features of the vessel 100 or components of the vessel 100 to interpret the movement of the vessel 100 when generating the first signal. The physical features may include any feature that may be used to determine how, e.g., the vessel 100 may respond to wave elevation or weather conditions.

At block 510, the second sensor 210 may detect movement of the cable 115 based on, e.g., a force $F_2$ applied to the cable 115. The force $F_2$ may represent forces caused by the movement of the vessel 100 or any other disturbance on the cable 115. The second sensor 210 may be configured to generate the second signal based on, e.g., the movement of the cable 115. The second sensor 210 may further consider physical features of the cable 115, such as length, thickness, etc., when generating the second signal.

At block 515, the controller 220 may, using the first signal, derive or estimate the motion of components on the vessel 100 based on the movement of the vessel 100 detected at block 505. For instance, the controller 220 may derive or estimate movement of a crane disposed on the vessel 100. Although not shown, the crane may be used to lower the payload 110 to the seabed 125, and in some instances, operate the payload 110 when the payload 110 reaches the seabed 125. Therefore, the cable 115 may be connected to the crane, and thus, any movement of the vessel 100 may be transferred to the cable 115 via the crane. The controller 220 may determine the movement of the crane based on hydrodynamic forces caused by wave elevation and the movement of the vessel 100. The controller 220 may generate a first output signal representing the movement of the crane.

At block 520, the controller 220 may use the first output signal representing the movement of the crane generated at block 515, as well as an operator command, to generate a resultant signal that compensates for movement of the vessel 100. The operator command may represent commanded movement of the vessel 100, the crane, or both, by an operator of the vessel 100 and/or crane. Accordingly, the resultant signal generated at block 520 may be used to control the actuator 215 to compensate for the movement of the vessel 100 and/or the movement of the crane whether caused by wave elevation, wind, or other weather conditions, as well as any operator commands.

At block 525, the controller 220 may receive the second signal from the second sensor 210 and use the second signal to generate a second output signal that may be used to substantially attenuate movement of the cable 115. For instance, the controller 220 may apply an integral force feedback algorithm that considers, e.g., the average tension of the cable 115 in light of the mass of the payload 110, the mass of the cable 115, and a buoyancy factor. The second output signal generated at block 525 may be used to compensate for movement of the cable 115 caused by, e.g., the vessel 100 or other disturbances on the cable 115.

At summation block 530, the resultant signal generated at block 520 to compensate for the movement of the vessel 100 and the second output signal generated at block 525 to compensate for the movement of the cable 115 may be combined to generate the control signal that, as described above, may compensate for both the movement of the vessel 100 and the movement of the cable 115.

At block 535, the controller 220 may, using feedback from the actuator 215, modify the control signal generated at block 530 to improve the operation of the control system 120. The dynamics of the vessel 100, the cable 115, and the payload 110 given the wave elevation represent a non-linear system. The controller 220 may implement a sliding mode control technique to compensate for these dynamics. Using the sliding mode control technique, the controller 220 may predict the movement of the vessel 100, the cable 115, or both, and generate a modified control signal based on the predicted movement.

At block 540, the actuator 215 may receive the control signal generated at block 530 and, in some instances, the modified control signal at block 535. The actuator 215 may, either directly or indirectly, act on the cable 115 as indicated by the force $F_3$ to attenuate the movement of the cable 115 as commanded by the control signal. As discussed above, the actuator 215 may include a winch 310 that may change the effective length of the cable 115 based on an angular displacement commanded by the control signal. Alternatively, the actuator 215 may include the hydraulic cylinder 415, and the control signal may command the actuator 215 to change the effective length of the cable 115 by changing a distance between a first sheave 305 relative to a second sheave 405. The actual position of the actuator 215, which may represent the actual angular displacement of the winch 310 or the actual distance between the first sheave 305 and the second sheave 405, may be communicated to block 535 as feedback.

Figure 6:
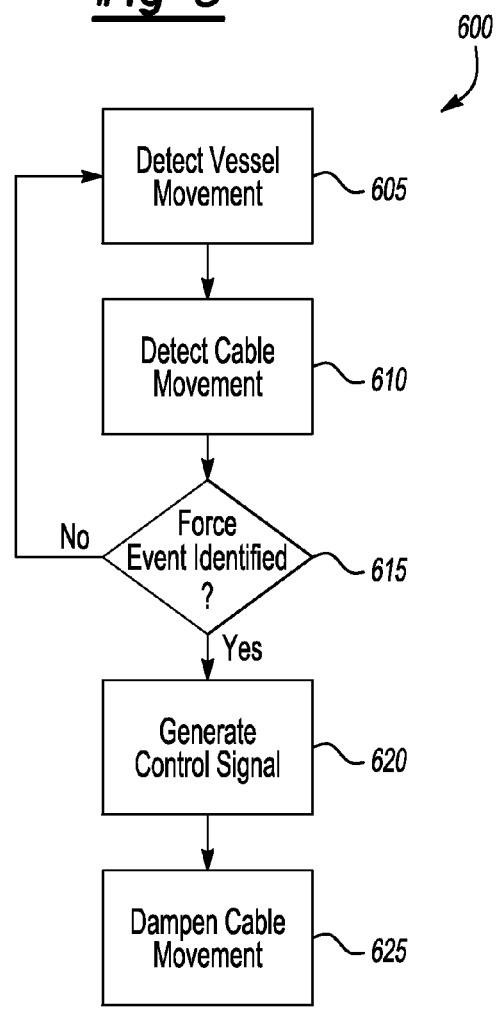
FIG. 6 illustrates a flowchart of an example process that may be implemented by a damping control system to compensate for movement of a vessel and a cable.

FIG. 6 illustrates an example process 600 that may be implemented by the control system 120 to, e.g., compensate for the movement of the vessel 100 and the cable 115 to prevent damage to the payload 110. As discussed above, movement of the vessel 100 may damage the payload 110, which may, in operation, be stationary relative to the seabed 125. Since the cable 115 connects the payload 110 to the vessel 100, any motion of the vessel 100 may be transferred to the payload 110 via the cable 115. Accordingly, compensating for the movement of the vessel 100 and the cable 115 relative to the seabed 125 may reduce the risk of damage to the payload 110.

At block 605, the first sensor 205 may detect movement of the vessel 100 based on, e.g., the pitch, roll, heave, etc., of the vessel 100 relative to the seabed 125 due to wave elevation, wind, or other weather conditions. The first sensor 205 may use the movement of the vessel 100 to derive or estimate movement of one or more components disposed on the vessel 100, such as a crane. The first sensor 205 may generate the first signal representing the movement of the vessel 100.

At block 610, the second sensor 210 may detect movement of the cable 115 relative to the seabed 125. The movement of the cable 115 may be caused by any combination of the movement of the vessel 100 or any other disturbance on the cable 115. The movement of the vessel 100 may be transferred to the cable 115 through the crane disposed on the vessel 100, thus causing the cable 115 to vibrate. The second sensor 210 may generate the second signal representing this movement of the cable 115.

At decision block 615, the controller 220 may identify a force event. Not all movement of the vessel 100 and/or cable 115 may be harmful to the payload 110. Therefore, to conserve resources, the controller 220 may be configured to identify instances where the movement of the vessel 100 and/or cable 115 could harm the payload 110 as force events. If the controller 220 determines that the force event exists, the process 600 may continue at block 620. If, however, the controller 220 determines that the movement of the vessel 100 and/or cable 115 is not sufficient to harm the payload 110 (e.g., no force event exists), the process 600 may return to block 605.

At block 620, the controller 220 may generate the control signal used to control the actuator 215 to dampen the movement of the cable 115. The control signal may generate the control signal based on the detected movement of the vessel 100 and the cable 115 using the first signal and the second signal. Moreover, the controller 220 may consider, e.g., feedback from the actuator 215 and the sliding mode technique discussed above with respect to FIG. 5, etc., when generating the control signal.

At block 625, the controller 220 may dampen the movement of the cable 115. For instance, the controller 220 may control the actuator 215 during the force event based, at least in part, on the detected movement of the vessel 100 and the cable 115 to dampen the force applied to the payload 110 using, e.g., the control signal generated at block 620. For instance, the actuator 215 may rotate in response to receiving the control signal to change the effective length of the cable 115. The control signal may command that the actuator 215 move to a particular position based on an angular displacement indicated by the control signal. Alternatively, the actuator 215 may, based on the control signal, change the distance 410 between, e.g., the first sheave 305 and the second sheave 405 to change the effective length of the cable 115. Moreover, as previously discussed, the controller 220 may predict the movement of the vessel 100, the cable 115, or both, using the sliding mode technique. Therefore, the control signal may be used to control the actuator 215 based on the predicted movement of the vessel 100 and/or cable 115.

Figure 7:
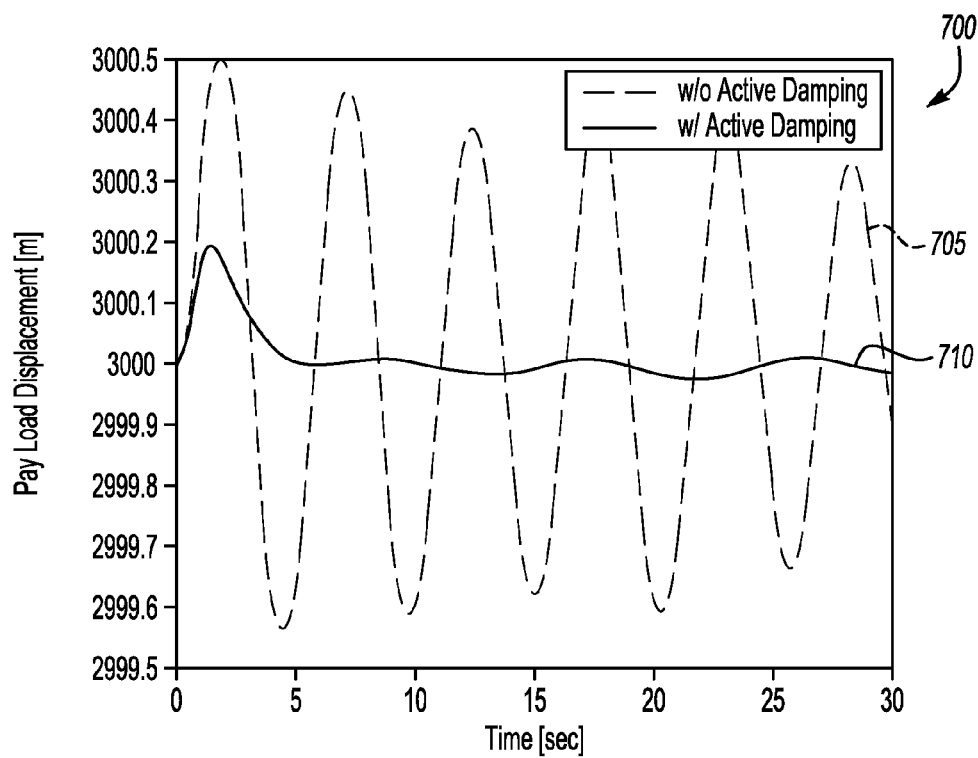
FIG. 7 illustrates a graph of an example payload displacement with and without a damping control system.

FIG. 7 illustrates a graph 700 of a simulated displacement of the payload 110 with and without the control system 120. The line 705 represents the displacement of the payload 110 when only compensating for the movement of the vessel 100 (e.g., there is no compensation for the movement of the cable 115). As illustrated, the residual movement of the vessel 100 after compensation is transferred through the cable 115 to the payload 110, together with other disturbances injected into the payload 110, such as ocean current, causing the payload 110 to vibrate. The line 710, on the other hand, represents the displacement of the payload 110 using the control system 120 described above. As illustrated, the control system 120 is able to substantially attenuate the movement of the cable 115 that would otherwise be transferred to the payload 110.

Figure 8:
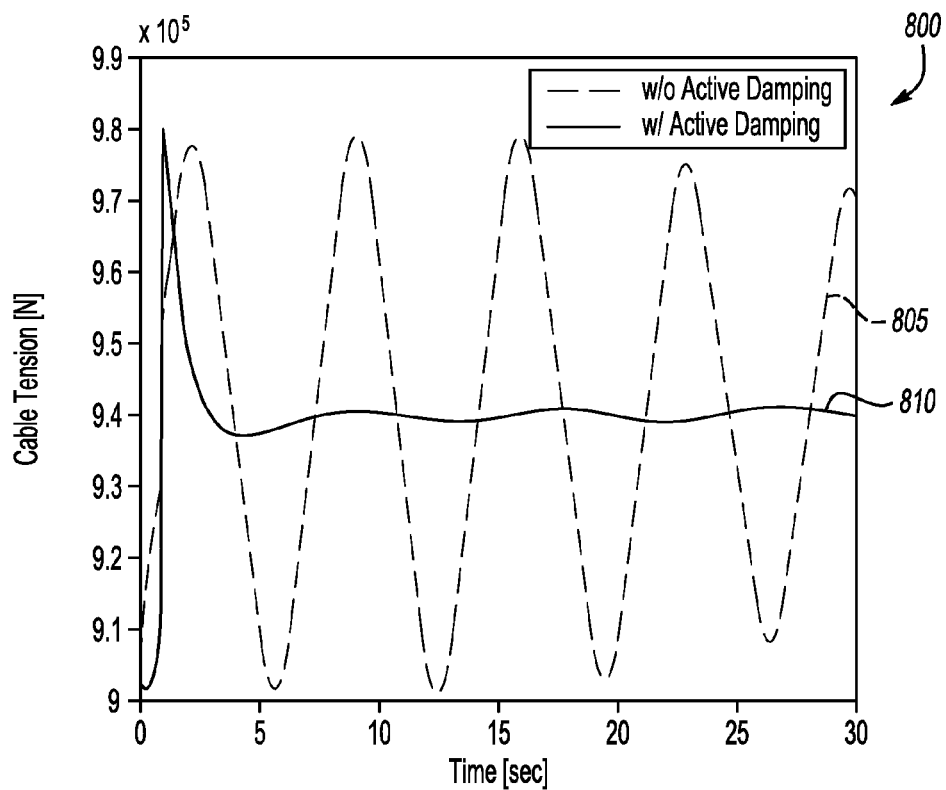
FIG. 8 illustrates a graph of an example cable tension with and without a damping control system.

FIG. 8 illustrates a graph 800 of a simulated cable tension with and without the control system 120 described above. The line 805 represents the tension applied to the cable 115 as a result of the movement of the vessel 100. Without the compensation system applied to the vessel 100, the cable 115 must be designed to sustain a wide range of cable 115 tensions over a prolonged period of time (e.g., the amount of time the payload 110 interacts with the seabed 125). The line 810, however, illustrates the tension applied to the cable 115 when compensating for the movement of the vessel 100 and the cable 115. As illustrated, the control system 120 is able to dampen the movement of the cable 115, and thus, the tension of the cable 115 is reduced. Accordingly, the cable 115 does not sustain excessive forces for prolonged periods of time. As a result, lighter cable 115 may be used to connect the vessel 100 to the payload 110.

While the best modes for carrying out the invention have been described in detail, those familiar with the art to which this invention relates will recognize various alternative designs and embodiments for practicing the invention within the scope of the appended claims.

The invention claimed is:

1. A method of dampening force applied to a payload secured to a vessel, the method comprising:
   detecting one of a pitch, heave, and roll movement of the vessel relative to a payload and generating a first signal representing the detected movement of the vessel with a first sensor;
   detecting a movement of a cable relative to the payload and generating a second signal representing the detected movement of the cable with a second sensor;
   identifying a force event based on the movement of the vessel and movement of the cable, wherein the force event causes a force to be applied to the payload via the cable;
   controlling an actuator during the force event based at least in part on the detected movement of the vessel and the detected movement of the cable to dampen the force applied to the payload; and
   generating a control signal, with the controller, based at least in part on the first signal and second signal, wherein generating the control signal based at least in part on the first signal and second signal includes:
   estimating, via the controller, a movement of at least one component disposed on the vessel based at least in part on the first signal and generating a first output signal representing the movement of the at least one component;
   generating, via the controller, a resultant signal based on the first output signal and an operator command representing a commanded movement of the vessel, the resultant signal representing an adjustment to an effective length of the cable sufficient to substantially attenuate the movement of the vessel with respect to the payload;
   generating, via the controller, a second output signal based at least in part on the second signal, the second output signal representing an adjustment to the effective length of the cable sufficient to substantially attenuate the movement of the cable with respect to the payload; and
   calculating, via the controller, a summation of the resultant signal and the second output signal, wherein the control signal is defined by the summation of the resultant signal and the second output signal, such that the control signal represents an adjustment to the effective length of the cable sufficient to substantially dampen the force applied to the payload as a result of the movement of the cable with respect to the payload and the movement of the vessel with respect to the payload.

2. The method set forth in claim 1, wherein the actuator is configured to rotate, and wherein controlling the actuator includes controlling an angular displacement of the actuator to change an effective length of the cable during the force event.

3. The method set forth in claim 1, wherein controlling the actuator during the force event includes controlling the actuator to change a distance between a first sheave and a second sheave to change an effective length of the cable during the force event.

4. The method set forth in claim 1, wherein controlling the actuator includes:
   predicting the movement of at least one of the vessel and the cable; and controlling the actuator during the force event based at least in part on the predicted movement of at least one of the vessel and the cable.

5. The method set forth in claim 1, wherein the payload is stationary relative to a seabed, and wherein at least one of detecting movement of the vessel and detecting movement of the cable includes detecting movement relative to the seabed.

6. The method of claim 1 wherein controlling an actuator during the force event based at least in part on the detected movement of the vessel and the detected movement of the cable to dampen the force applied to the payload further includes:
  transmitting the control signal, via the controller, to the actuator configured to adjust the effective length of the cable;
  commanding, via the controller, the actuator to adjust the effective length of the cable during a force event based on the control signal to thereby dampen the force applied to the payload as a result of the movement of the cable with respect to the payload and the movement of the vessel with respect to the payload.

7. The method of claim 6 further comprising modifying the control signal and generating a modified control signal, wherein modifying the control signal further includes:
  predicting the movement of at least one of the vessel with respect to the payload and the cable with respect to the payload based at least in part on a sliding mode control technique; and
  controlling the actuator during the force event based at least in part on the predicted movement of at least one of the vessel and the cable.

8. The method of claim 1 wherein generating the second output signal further includes:
  applying an integral force feedback algorithm, such that the integral force feedback algorithm considers each of the second signal, an average tension of the cable, a mass of the cable, and a buoyancy factor.

9. A method comprising:
  detecting, via a first sensor, a movement of a vessel with respect to a payload caused by a first force and returning a first signal to a controller representing the movement of the vessel;
  detecting, via a second sensor, a movement of a cable with respect to the payload caused by a second force and returning a second signal to the controller representing the movement of the cable;
  estimating, via the controller, a movement of at least one component disposed on the vessel based at least in part on the first signal and generating a first output signal representing the movement of the at least one component;
  generating, via the controller, a resultant signal based on the first output signal and an operator command representing a commanded movement of the vessel, the resultant signal representing an adjustment to an effective length of the cable sufficient to substantially dampen the force applied to the payload as a result of the movement of the vessel with respect to the payload;
  generating, via the controller, a second output signal based at least in part on the second signal, the second output signal representing an adjustment to the effective length of the cable sufficient to substantially attenuate the movement of the cable with respect to the payload;
  generating a control signal, via the controller, the control signal representing an adjustment to the effective length of the cable sufficient to substantially dampen the force applied to the payload as a result of the movement of the cable with respect to the payload and the movement of the vessel with respect to the payload, such that the control signal is defined as a summation of the resultant signal and the second output signal;
  transmitting the control signal, via the controller, to an actuator configured to adjust the effective length of the cable to compensate for the movement of the vessel with respect to the payload and the movement of the cable with respect to the payload;
  commanding, via the controller, the actuator to adjust the effective length of the cable during a force event based on the control signal to thereby dampen the force applied to the payload as a result of the movement of the cable with respect to the payload and the movement of the vessel with respect to the payload; and
  wherein the payload is secured to the vessel via the cable and the payload is disposed on a seabed and is stationary with respect to the seabed.

10. The method of claim 9 further comprising modifying the control signal, via the controller, wherein modifying the control signal further includes:
  predicting the movement of at least one of the vessel with respect to the payload and the cable with respect to the payload based at least in part on a sliding mode control technique; and
  controlling the actuator during the force event based at least in part on the predicted movement of at least one of the vessel and the cable.

* * * * *